United States Patent
Spellman et al.

(10) Patent No.: US 8,857,620 B2
(45) Date of Patent: *Oct. 14, 2014

(54) CEMENTITIOUS COMPOSITION AND APPARATUS AND METHOD FOR MANUFACTURING THE SAME

(75) Inventors: Louis U. Spellman, Lakeway, TX (US); Jose Garcia, San Antonio, TX (US)

(73) Assignee: Capitol Aggregates, Inc., San Antonio, TX (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/312,390

(22) Filed: Dec. 6, 2011

(65) Prior Publication Data
US 2012/0074251 A1 Mar. 29, 2012

Related U.S. Application Data (62) Division of application No. 12/945,816, filed on Nov. 12, 2010, now Pat. No. 8,079,538, which is a division of application No. 12/025,434, filed on Feb. 4, 2008, now Pat. No. 7,927,417.

(51) Int. Cl.
*B07B 9/00* (2006.01)
*C04B 7/52* (2006.01)

(52) U.S. Cl.
CPC .................................. *C04B 7/527* (2013.01)
USPC ........................................... 209/30; 106/713

(58) Field of Classification Search
USPC ............... 209/21, 30, 133, 710, 711; 241/79; 106/713, 816
See application file for complete search history.

(56) References Cited

U.S. PATENT DOCUMENTS

| | | | |
|---|---|---|---|
| 2,554,450 A | 5/1951 | Ayers | |
| 2,879,052 A | 3/1959 | Azbe | |
| 3,546,787 A * | 12/1970 | Horner et al. | 209/138 |
| 4,160,674 A | 7/1979 | Sawyer | |
| 4,551,241 A * | 11/1985 | Saverse et al. | 209/135 |
| 4,595,416 A | 6/1986 | Cohen | |
| 4,682,948 A | 7/1987 | Cohen | |

(Continued)

FOREIGN PATENT DOCUMENTS

| | | |
|---|---|---|
| EP | 0513367 A1 | 11/1992 |
| EP | 0980852 A1 | 2/2000 |

OTHER PUBLICATIONS

Price, Bill, "The Finer Things," World Cement Magazine, Nov. 2012 (3 pages).

*Primary Examiner* — Joseph C Rodriguez
*Assistant Examiner* — Kalyanavenkateshware Kumar
(74) *Attorney, Agent, or Firm* — Cox Smith Matthews Incorporated; Courtenay B. Allen; Michael Gostkowski (57) ABSTRACT

A cementitious composition capable of forming high early strength cement when admixed with water may comprise, for each 100% by weight, no more than about 60% by weight $C_3S$, at least about 4% by weight $C_2S$, and between about 7% and about 11% by weight $SO_3$, wherein the cementitious composition has a particle size distribution such that substantially all of its particles are of a size of about 10 microns or smaller. A cementitious composition may have a ratio of weight % $SO_3$ to weight % $Al_2O_3$ of at least about 1.5 and a particle size distribution such that substantially all of its particles are of a size of about 10 microns or smaller. An apparatus and method for making such a cementitious composition are also described.

5 Claims, 1 Drawing Sheet

(56) References Cited

U.S. PATENT DOCUMENTS

| | | |
|---|---|---|
| 4,783,012 A | 11/1988 | Blasczyk et al. |
| 4,957,556 A | 9/1990 | Kunbargi |
| 5,054,694 A | 10/1991 | Knobloch et al. |
| 5,071,484 A | 12/1991 | Bonifay et al. |
| 5,110,056 A | 5/1992 | Blasczyk et al. |
| 5,111,998 A | 5/1992 | Kanda et al. |
| 5,358,676 A | 10/1994 | Jennings et al. |
| 5,375,776 A | 12/1994 | Kupper et al. |
| 5,547,505 A | 8/1996 | Nakatsu et al. |
| 5,584,926 A | 12/1996 | Borgholm et al. |
| 5,658,624 A | 8/1997 | Anderson et al. |
| 5,897,063 A | 4/1999 | Patzelt et al. |
| 6,113,684 A | 9/2000 | Kunbargi |
| 6,346,146 B1 | 2/2002 | Duselis et al. |
| 6,457,659 B1 | 10/2002 | Yang et al. |
| 6,645,289 B2 | 11/2003 | Sobolev et al. |
| 7,083,130 B2 | 8/2006 | Tomikawa et al. |
| 7,150,786 B2 | 12/2006 | Kunbargi |
| 7,264,185 B2 | 9/2007 | Tomikawa et al. |
| 2004/0187740 A1 | 9/2004 | Timmons |

\* cited by examiner

CEMENTITIOUS COMPOSITION AND APPARATUS AND METHOD FOR MANUFACTURING THE SAME

CROSS REFERENCE TO RELATED APPLICATIONS

This application is a Divisional of U.S. patent application Ser. No. 12/945,816 filed Nov. 12, 2010, now U.S. Pat. No. 8,079,538 which is a Divisional of U.S. patent application Ser. No. 12/025,434 filed Feb. 4, 2008, now U.S. Pat. No. 7,927,417 the disclosures of which are incorporated herein by reference.

FIELD

This application relates generally to cementitious compositions and apparatuses and methods for manufacturing the same.

BACKGROUND

Microfine cementitious compositions are generally similar to standard types of portland cement, except that such compositions have liner particle size distributions. These finer particle sizes, together with differences in chemistry, result in early setting, high strength cements. High early strength cement is desirable in numerous applications. For example, a microfine cementitious compound may be used to grout defects of oil and gas wells, that is, to fill the microscopic cracks, voids, and fissures which may be present in the formation or annular cement. Such microscopic defects are generally on the order of about 50 microns in size. Those defects are repaired when the microfine cement sets within the defects, resulting in the repair of the defects. Similarly, a microfine cementitious compound may be used to grout microscopic defects within bridges, dams, roads, airport runways, or other infrastructure projects.

Numerous physical properties determine the efficacy of microfine cementitious compositions in remediating microscopic defects. For example, a cement slurry formed from a microfine cementitious composition should be pumpable into the particular structure being remediated. Pumpability may be evaluated by reference to both the setting time and the viscosity of the cement slurry. If the slurry is too viscous, or sets too quickly, it will not be sufficiently pumpable. On the other hand, it the slurry is too viscous or sets too slowly, it may not set within the microscopic defects. The slurry should exhibit sufficiently high compressive strength to effectively reinforce the microscopic defects.

Microfine cementitious compositions make up a negligible portion of total cement produced when compared to the volume of overall portland cement production. There are five basic types of portland cement outlined by American Society for Testing and Materials (ASTM) Specification C150 and American Association of State Highway and Transportation Officials (AASHTO) Specification M 85. These standards specify such physical properties as chemical composition, fineness, soundness, consistency, setting time, compressive strength, heat of hydration, specific gravity, and loss on ignition (L.O.I.). Each one of these properties has an influence on the performance of the cement, and the different types of portland cement are therefore suited to particular applications.

For example, Type I cement is a general purpose cement used in the majority of construction, such that approximately 90% of all cement produced falls within this category. Type II cement may generally be used when a moderate sulfite resistance is desired. Type III cement may generally be used when a relatively high early strength is desired. Type III cement is similar in composition to Type I cement, except that it is much finer, with a typical Blaine fineness of about 5500 $cm^2/g$ compared to a typical fineness of about 3500 $cm^2/g$ for Type I cement. Type IV cement may generally be used when a low heat of hydration is desired, while Type V cement may generally be used where high sulfate resistance is desired. The typical chemical composition of these cement types, in % by weight, is approximately as follows:

|  | Type I | Type II | Type III | Type IV | Type V |
| --- | --- | --- | --- | --- | --- |
| $C_3S$ | 55% | 51% | 57% | 28% | 38% |
| $C_2S$ | 19% | 24% | 19% | 49% | 43% |
| $C_3A$ | 10% | 6% | 10% | 4% | 4% |
| $C_4AF$ | 7% | 11% | 7% | 12% | 9% |
| $SO_3$ | 2.9% | 2.5% | 3.1% | 1.9% | 1.8% |
| MgO | 2.8% | 2.9% | 3.0% | 1.8% | 1.9% |
| L.O.I. | 1.0% | 0.8% | 0.9% | 0.8% | 0.9% |

The setting of cement involves the chemical reaction of hydration. In general terms, the early hydration of cement is principally controlled by the amount and activity of $C_3A$, balanced by the amount and type of $SO_3$ interground with the cement. As the fineness of $C_3A$ within a cement increases, the activity of the $Al_2O_3$ rises due to an increase in reactive surface area. Consequently, the greater the fineness of $C_3A$ within a cement, the higher the concentration of $SO_3$ required to inhibit the $Al_2O_3$. $C_3A$ hydrates very rapidly and will influence early bonding characteristics. If this hydration is not properly controlled by the sulfate, problems such as flash set, false set, slump loss, and cement-admixture incompatibility may result.

Of particular concern is the problem of false set, also known as early stiffening or premature stiffening, which may occur when an excessive amount of hemihydrate, i.e., the partially dehydrated form of gypsum ($CaSO_4 \cdot \frac{1}{2}H_2O$), is present in the cement. In particular, false set is primarily caused by the rehydration of hemihydrate back to gypsum, which precipitates out of the cement slurry. This gypsum precipitate causes the appearance of setting, when in reality the hydration of $C_3A$ has not yet begun in earnest, and is further inhibited by the presence of gypsum.

SUMMARY

A cementitious composition capable of forming high early strength cement when admixed with a liquid may comprise, for each 100% by weight, no more than about 60% by weight $C_3S$, at least about 4% by weight $C_2S$, and between about 7% and about 11% by weight $SO_3$, wherein the cementitious composition has a particle size distribution such that substantially all of its particles are of a size of about 10 microns or smaller. A cementitious composition may have a ratio of weight % $SO_3$ to weight % $Al_2O_3$ of at least about 1.7 and a particle size distribution such that substantially all of its particles are of a size of about 10 microns or smaller. An apparatus and method for making such a cementitious composition are also described.

DETAILED DESCRIPTION

As used herein, the following terms should be understood to have the indicated meanings:

When an item is introduced by "a" or "an," it should be understood to mean one or more of that item.

"Classifier" means a device for separating solids of different characteristics by controlled rates of settling.

"Comprises" means includes but is not limited to.

"Comprising" means including but not limited to.

"Having" means including but not limited to.

"Cementitious" means of or relating to a chemical substance having the characteristics of cement.

"Clinker" means a material comprising hydraulic calcium silicates. Clinker may be sintered into lumps or nodules, typically of a diameter no greater than about 3 inches, or other suitable size.

"Feed" means a device adapted for feeding one or more materials.

"Grinding" means to reduce or lessen into relatively smaller particles or pieces by pulverizing, pounding, cutting, crushing, grating, rubbing harshly, carving, sawing, trimming, or dissolving, or a combination thereof.

"Hemihydrate" means partially dehydrated gypsum, also commonly referred to as plaster of paris, which has a chemical formula of $CaSO_4 \cdot \frac{1}{2}H_2O$.

"Hydraulic" means able to set and harden by reacting with water, while also forming a water-resistant product.

"Inhibit" means to at least partially decrease the activity of an active chemical reagent, such as, for example, $Al_2O_3$.

"Microfine" means of or pertaining to units of measure described in terms of microns.

"Portland cement" is a type of hydraulic cement produced by pulverizing clinker with one or more forms of calcium sulfate, usually in the form of gypsum. Numerous processing additions, in addition to clinker and gypsum, may also be present.

"Remainder portion" means the portion of a bulk material that is not scalped.

"Scalping" means to remove a portion of a hulk material, whether such bulk material is in a continuous process stream or stored in a batch storage system or otherwise.

"Setting" and "set" mean the solidification and hardening of a cement slurry.

"Silo" means any object, space, or area suitable tar storing a cementitious compound, such as, for example, holding tanks, rail cars, pits, or drop piles.

"Grouting" means the tilling of a microscopic void with a microfine cementitious composition.

"Slurry" means a suspension of a solid in a liquid.

"Standardized portland cement" means a hydraulic cement having physical characteristics which satisfy a standardized cement type, such as, for example, the cement types described by the American Society for Testing and Materials in ASTM Specification C150 or those described by the American Association of State Highway and Transportation Officials in AASHTO Specification M 85.

The present application is directed to a microfine cementitious composition capable of forming a high, early-strength cement when admixed with a liquid. The application is also directed to an apparatus and method for making a microfine cementitious composition, which involves the scalping of microfine particles from a standardized portland cement.

In one embodiment, a microfine cementitious composition may be formed having a particle size distribution such that substantially all of its particles are of a size of about 10 microns or smaller, resulting in a surface area, i.e., Blaine fineness, of at least about 1,000 m²/kg. The chemical composition of one embodiment of such cementitious composition may comprise for each 100% by weight, no more than about 60% by weight $C_3S$, at least about 4% by weight $C_2S$, and between about 7% and about 11% by weight $SO_3$. Such embodiment of microfine cementitious composition may also have a ratio of weight % $SO_3$ to weight % $Al_2O_3$ of at least about 1.5.

The resultant microfine cementitious composition may be admixed with water or another suitable liquid to form a cement slurry. Such composition may also be admixed with sand and/or aggregates as is conventional with cement slurry preparation. For example, in one embodiment, a cement slurry may be formed by adding water at about 140% to about 150% by weight of the microfine cementitious composition. A person having ordinary skill in the art will understand that other processing additions may also be incorporated to the cement slurry, including, for example, microfine sand, accelerators, retarders, loss-circulation control agents, deairing control agents, and friction reducers. Suitable amounts of other additives may also be used such that they do not adversely affect the pumpability of the cement slurry or strength of the cement which results from setting of the cement slurry.

The cement slurry may have an initial consistency of greater than about 10 Bearden units of consistency ($B_c$), which is a dimensionless quantity used to measure the pumpability of a substance as known by persons of ordinary skill in the art. The thickening time of the cement slurry, or the time required for the cement slurry to reach what is generally considered the maximum pumpable consistency of 70 $B_c$, generally may be greater than about 90 minutes. The viscosity of the cement slurry, measured at 80° F. using a Model 35A Fann Viscometer and a No. 1 spring, may be greater than about 90 cps at 300 RPM. The compressive strength of the cement slurry may be between about 200 psi and about 500 psi after 24 hours, and between about 500 psi and about 700 psi after 7 days. The testing conditions under which the preceding properties of consistency, thickening time, viscosity, and compressive strength were measured are described in greater detail below in the cited examples. Of course, other suitable values for those properties may also be employed.

A microfine cementitious composition as described herein may be utilized in any environment where high early strength is desired. For example, in one embodiment, a slurry of a microfine cementitious composition may be used for cementing operations in oil and gas wells, more particularly, in grouting the cement casings of oil and gas wells. In such an application, the slurry may be pumped into the annulus between the bore hole and the formation, or into the formation directly, such that the microfine cement is forced into the small cracks, voids, and fissures which may be present in the casing: such defects generally being on the order of about 50 microns in size. The microfine cement then sets within the pore defects, resulting in the repair and remediation of the defects. A person having ordinary skill in the art will understand that numerous other remedial uses exist for a microfine cementitious composition as described herein. For example, a slurry of a microfine cementitious composition may be injected into the void spaces of bridges, dams, roads, airport runways, or other infrastructure projects in order to fill microscopic defects within such structures.

Figure 1:
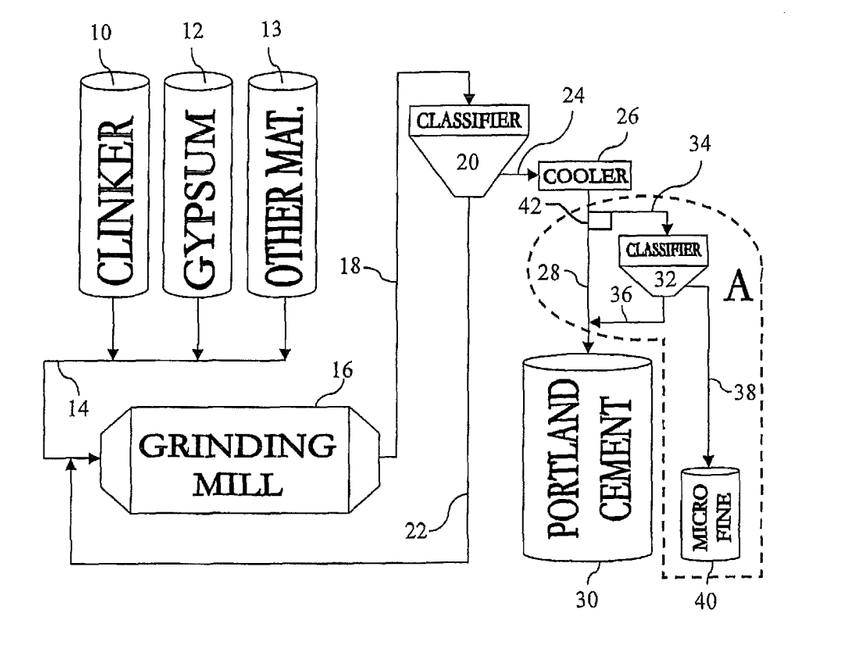
FIG. 1 is a schematic diagram illustrating an apparatus and process for manufacturing a microfine cementitious composition.

The present application is also directed to a method and apparatus for making such a microfine cementitious compound. One embodiment of the method by which a microfine cementitious composition may be made is illustrated by reference to the apparatus of FIG. 1. Referring to FIG. 1, clinker and gypsum in the feed bins 10 and 12, respectively, are passed in the desired proportions in flow line 14 to a grinding mill 16. The output of the grinding mill 16 is then passed by flow line 18 into a first classifier 20, for example an air separator commonly used in the manufacture of cement, which separates out the coarser particles from finer particles which constitute a standard portland cement. ASTM Specification C150 and AASHTO Specification M 85 define the physical properties of some standardized forms of portland cement, and a person having ordinary skill in the art will understand that various proportions of clinker and gypsum may be used to create such standardized portland cements. Furthermore, numerous other materials 13 may be added to the clinker and gypsum feed stream in flow line 14 to create standardized or specialized forms of portland cement. For example, coal combustion products, such as fly ash; residual products from industrial smelting processes, such as blast furnace slag: and limestone may all be added to the clinker and gypsum, either alone or in combination.

Still referring to FIG. 1, the coarser output of the first classifier 20 may be returned by means of a flow line 22 to the input flow line 14 to the grinding mill 16 for further grinding. The finer output from the classifier 20 may then be transferred to a cooler 26 by means of a flow line 24 to cool the finer output and prevent formation of hemihydrate. The rate of formation of hemihydrate in the cement of flow line 24 depends on a number of factors, such as the bulk temperature of the cement within the grinding mill 16, the residence time of the cement at the hulk temperature, the relative humidity of the air, and the ambient temperature. A person having ordinary skill in the art will understand that cooler 26 may be operated in various ways so as to inhibit the formation of hemihydrate. For example, in a typical Type I cement grinding process having a bulk temperature of about 260° F., which produces about 1500 tons of cement every 24 hours at a relative humidity of about 80% and ambient temperature of about 80° F., the formation of hemihydrate may be inhibited by operating cooler 26 such that the bulk temperature of the cooled cement output from cooler 26 in flow line 28 is kept below about 135° F. If desired, output of the cooler 26 may then be transferred to storage silo 30 by means of a flow line 28 to provide a standard portland cement.

To obtain a cementitious composition having substantially all of its particles of about 10 microns and smaller, a portion of the output of the cooler 26 may be diverted from flow line 28 to a second classifier 32 by means of a flow line 34. A person having ordinary skill in the art will understand that numerous devices may be used to divert a portion of the output of the cooler 26 to control the rate of feed to the second classifier 32, such as, for example, using a flapper valve and feeder, or using a diverter partition with a metering device. A diverter 42 disposed along the flow line 28 is shown in FIG. 1. In one embodiment, the portion of the output of the cooler 26 diverted to the second classifier 32 may be greater than about 10% by volume and less than about 30% by volume of the output of the cooler 26, though a person having ordinary skill in the art will recognize that a smaller or larger portion of the output of the cooler 26 may be used depending on the desired rate of manufacture of the microfine cementitious composition. The process of diverting a portion of a flow line is known as scalping.

A person having ordinary skill in the art will further recognize that cooler 26 may be situated on any number of process flow lines in order to cool the cementitious composition. For example, cooler 26 may also be positioned on flow line 18 to cool the output from the grinding mill 16, flow line 22 to cool the coarser output of the first classifier 20, flow line 28 to cool the finer output of the first classifier 20 and coarser output of the second classifier 32, and/or on flow line 38 to cool the finer output from the second classifier 32. Any number of coolers may be used at any desired location and in any combination.

The second classifier 32 may be a centrifugal, fine particle classifier that disburses and then classifies the particles into a coarser output of greater than about 10 microns and a finer output of about 10 microns and smaller. For example, a Classiclon™ CC-F ultrafine classifier sold by PM-Technologies. GmbH or an MS-20 classifier sold by RSG, Inc. may be used, or any other suitable classifier. The coarser output of the second classifier 32 (sometimes referred to herein as a secondary portion) may be returned to flow line 28 by means of flow line 36 such that said coarser output is transferred to storage silo 30. Alternatively, said coarser output from second classifier 32 may be transferred directly to storage silo 30.

The finer output of the second classifier 32, i.e., the particles of about 10 micron size and smaller, which is sometimes referred to herein as a primary portion, may be transferred by flow line 38 to storage silo 40. In one embodiment, the coarser particles rejected by the second classifier 32 may be returned to flow line 28 or transferred directly to storage silo 30 such that both the composition of the finer output of the first classifier 20 and the cementitious composition in storage silo 30 exhibit physical characteristics indicative of the same type of standardized portland cement, such as, for example. Type I portland cement. In such an embodiment, the scalping of some of the particles of about 10 micron size and smaller from a standardized portland cement in flow line 28 may occur without changing the classification of such standardized portland cement, e.g., the scalping of Type I portland cement may result in both a microfine cementitious composition and a Type I portland cement. Alternatively, the scalping of a Type I portland cement may result in both a microfine cementitious composition and another type of specialty cement. Other types of cement products may also be produced if desired.

In another embodiment, the elements indicated by the dotted line of region A, i.e., the second classifier 32, flow lines 34, 36, and 38, and storage silo 40, may be used in conjunction with a standardized portland cement, whether such standardized cement is in a continuous process stream, as indicated by flow line 28 of FIG. 1, or stored in a batch storage system. For example, the elements indicated by the dotted line of region A may be retrofitted into preexisting portland cement production facilities, or may be operated separately from such facilities, so as to create a microfine cementitious composition in addition to the preexisting portland cement. As a result, only minimal changes to the current manufacturing process for standard portland cements may be made.

In one embodiment, the material in flow line 28 may be a Type III portland cement and the resulting microfine cementitious composition may have, for each 100% by weight, between about 3% and about 7% by weight $SO_3$. In another embodiment, the material in flow line 28 may be a Type I portland cement and the resulting microfine cementitious composition may have, for each 100% by weight, between about 7% and about 11% by weight $SO_3$. The higher $SO_3$ concentration in a microfine cementitious composition made from Type I portland cement is surprising and counterintuitive, since Type I cement generally has a lower concentration of $SO_3$ than Type III cement, namely, between about 2.9% and about 3.5% by weight $SO_3$ in Type I cement compared to between about 3.1% and about 4.5% by weight $SO_3$ in Type III cement. Type I portland cement is the most prevalent form of portland cement, constituting approximately 90% of all portland cement production. Type I cement is also generally the least expensive type of portland cement.

A person having ordinary skill in the art will understand that the overall concentration of $SO_3$ in the microfine cementitious composition may be controlled by adjusting the rotor tip velocity in the second classifier 32. For example, in one embodiment, a 12-inch diameter rotor operated at about 3000 RPM, and having a rotor tip velocity of about 160 fps, may be used to create a microfine cementitious composition comprising between about 7% and about 11% by weight $SO_3$. A similar composition may also be achieved, for example, by operating a 13-inch diameter rotor at about 3000 RPM, and having a rotor tip velocity of about 170 fps.

Embodiments of the invention will be further described in connection with the following examples, which are set forth for purposes of illustration only:

EXAMPLE 1

A cementitious composition was prepared from Type I portland cement. More particularly, a cementitious composition was formed by admixing about 93% by weight of clinker and about 7% by weight of gypsum, feeding such mixture into a grinding mill circuit and cooler to produce a Type I portland cement discharge stream, and then feeding about 10% by volume of said discharge stream into a high efficiency air separator operated so as to separate particles of a size of about 10 microns and less. The coarser particles rejected by the separator were returned to the discharge stream such that the overall composition of the discharge stream maintained the characteristics of a Type I portland cement.

The specific gravity of the cementitious composition was about 2.92 and the ratio of $SO_3:Al_2O_3$ was about 2.42. The cementitious composition was tested for compressive strength in accordance with API Spec 10A. More particularly, water was admixed with the dry cementitious composition, in values relative to the weight of the cementitious composition, namely, water at about 141% by weight of the cementitious composition. The mixture was allowed to harden at about 80° F. and atmospheric pressure, with about 100% humidity, which resulted in a compressive strength, measured after 24 hours, of about 270 psi.

To determine the pumpability of the cementitious composition, a cement slurry was prepared according to the procedures outlined in API Schedule 9.2. The initial cement slurry viscosity in Bearden units of consistency ($B_c$) was about 10 $B_c$. The cement slurry was then heated to a test temperature of about 80° F. to determine the thickening time, or the time required for the cement slurry to reach what is generally considered the maximum pumpable consistency of about 70 $B_c$. The cement slurry reached a consistency of about 70 $B_c$ in about 0:20 hr:min. The viscosity of the cement slurry was also measured at about 80° F. using a Model 35A Fann Viscometer, which is a rotational type rheometer and a No. 1 spring. The mean particle size was about 2.3 microns. The cementitious composition had the following particle size distribution, chemistry and viscosity:

| A. Particle size distribution | |
|---|---|
| % Under 9.00 microns | 100.00% |
| % Under 4.19 microns | 81.73% |
| % Under 1.95 microns | 43.51% |

| B. Chemistry | |
|---|---|
| | % by Weight |
| $C_3S$ | 52.72% |
| $C_2S$ | 6.74% |
| $C_3A$ | 8.75% |
| $C_4AF$ | 4.52% |
| CaO | 57.98% |
| $SiO_2$ | 16.22% |
| $SO_3$ | 10.29% |
| $Al_2O_3$ | 4.25% |
| MgO | 1.03% |
| $Fe_2O_3$ | 1.49% |
| $K_2O$ | 1.63% |
| $TiO_2$ | 0.27% |
| $Na_2O$ | 0.23% |
| Trace Oxides | 0.66% |
| L.O.I. | 5.95% |

| C. Viscosity | |
|---|---|
| RPM | cps |
| 300 | 174 |
| 200 | 152 |
| 100 | 125 |
| 60 | 110 |
| 30 | 92 |
| 6 | 56 |
| 3 | 43 |
| 10 Second Gel | 41 |
| 10 Minute Gel | 43 |

EXAMPLE 2

A cementitious composition was prepared as in Example 1, except that the composition had a specific gravity of about 3.09 and a ratio of $SO_3:Al_2O_3$ of about 1.59. The compressive strength of the composition, measured after 24 hours as in Example 1, was about 430 psi. The compressive strength measured after 7 days was about 540 psi. The initial viscosity of the cement slurry, prepared as in Example 1, was about 8 $B_c$ and the slurry reached a consistency of about 70 $B_c$ in about 3:21 hr:min. The viscosity of the cement slurry was measured as in Example 1. The mean particle size was about 1.7 microns. The cementitious composition had the following particle size distribution, chemistry and viscosity:

| A. Particle size distribution | |
|---|---|
| % Under 7.72 microns | 100.00% |
| % Under 4.19 microns | 91.73% |
| % Under 1.95 microns | 58.24% |

| B. Chemistry | |
|---|---|
| | % by Weight |
| $C_3S$ | 56.15% |
| $C_2S$ | 9.82% |
| $C_3A$ | 10.57% |
| $C_4AF$ | 5.71% |
| CaO | 58.40% |
| $SiO_2$ | 16.92% |
| $SO_3$ | 7.69% |
| $Al_2O_3$ | 4.83% |
| MgO | 1.20% |
| $Fe_2O_3$ | 1.75% |
| $K_2O$ | 1.41% |
| $TiO_2$ | 0.20% |
| $Na_2O$ | 0.20% |
| Trace Oxides | 0.50% |
| L.O.I. | 6.90% |

-continued

| C. Viscosity | |
| --- | --- |
| RPM | cps |
| 300 | 183 |
| 200 | 162 |
| 100 | 133 |
| 60 | 120 |
| 30 | 100 |
| 6 | 59 |
| 3 | 59 |
| 10 Second Gel | 21 |
| 10 Minute Gel | 61 |

EXAMPLE 3

A cementitious composition was prepared as in Example 1, except that the composition had a specific gravity of about 3.09 and a ratio of $SO_3:Al_2O_3$ of about 1.52. The compressive strength of the composition, measured after 24 hours and after 7 days as in Example 2, was about 450 psi and about 600 psi, respectively. The initial viscosity of the cement slurry, prepared as in Example 1, was about 13 $B_c$ and the slurry reached a consistency of about 70 $B_c$ in about 3:52 hr:min. The viscosity of the cement slurry was measured as in Example 1. The mean particle size was about 1.7 microns. The cementitious composition had the following particle size distribution, chemistry and viscosity:

| A. Particle size distribution | |
| --- | --- |
| % Under 6.63 microns | 100.00% |
| % Under 4.19 microns | 91.77% |
| % Under 1.95 microns | 56.97% |

| B. Chemistry | |
| --- | --- |
| | % by Weight |
| $C_3S$ | 58.62% |
| $C_2S$ | 9.58% |
| $C_3A$ | 10.73% |
| $C_4AF$ | 5.77% |
| CaO | 57.96% |
| $SiO_2$ | 16.81% |
| $SO_3$ | 7.34% |
| $Al_2O_3$ | 4.84% |
| MgO | 1.20% |
| $Fe_2O_3$ | 1.75% |
| $K_2O$ | 1.35% |
| $TiO_2$ | 0.22% |
| $Na_2O$ | 0.23% |
| Trace Oxides | 0.12% |
| L.O.I. | 8.20% |

| C. Viscosity | |
| --- | --- |
| RPM | cps |
| 300 | 165 |
| 200 | 146 |
| 100 | 117 |
| 60 | 103 |
| 30 | 84 |
| 6 | 45 |
| 3 | 37 |
| 10 Second Gel | 36 |
| 10 Minute Gel | 50 |

EXAMPLE 4

A cementitious composition was prepared as in Example 1, except that the Type I portland cement discharge stream was formed by admixing about 89% by weight of clinker, about 4.5% by weight of gypsum, about 2.5% by weight of limestone, and about 4% by weight of granulated blast furnace slag. The composition had a specific gravity of about 3.01 and a ratio of $SO_3:Al_2O_3$ of about 2.66. The compressive strength of the composition, measured after 24 hours and after 7 days as in Example 2, was about 470 psi and about 550 psi, respectively. The initial viscosity of the cement slurry, prepared as in Example 1, was about 4 $B_c$ and the slurry reached a consistency of about 70 $B_c$ in about 3:41 hr:min. The viscosity of the cement slurry was measured as in Example 1. The mean particle size was about 1.4 microns. The cementitious composition had the following particle size distribution, chemistry and viscosity:

| A. Particle size distribution | |
| --- | --- |
| % Under 9.00 microns | 100.00% |
| % Under 4.19 microns | 90.08% |
| % Under 1.95 microns | 62.57% |

| B. Chemistry | |
| --- | --- |
| | % by Weight |
| $C_3S$ | 52.09% |
| $C_2S$ | 9.45% |
| $C_3A$ | 9.47% |
| $C_4AF$ | 4.62% |
| CaO | 58.99% |
| $SiO_2$ | 16.28% |
| $SO_3$ | 11.55% |
| $Al_2O_3$ | 4.35% |
| MgO | 1.16% |
| $Fe_2O_3$ | 1.45% |
| $K_2O$ | 1.38% |
| $TiO_2$ | 0.22% |
| $Na_2O$ | 0.22% |
| Trace Oxides | 0.14% |
| L.O.I. | 4.26% |

| C. Viscosity | |
| --- | --- |
| RPM | cps |
| 300 | 183 |
| 200 | 162 |
| 100 | 133 |
| 60 | 120 |
| 30 | 100 |
| 6 | 59 |
| 3 | 59 |
| 10 Second Gel | 21 |
| 10 Minute Gel | 61 |

EXAMPLE 5

A cementitious composition was prepared as in Example 4, except that the composition had a specific gravity of about 3.04 and a ratio of $SO_3:Al_2O_3$ of about 2.07. The compressive strength of the composition, measured after 24 hours and after 7 days as in Example 2, was about 410 psi and about 590 psi, respectively. The initial viscosity of the cement slurry, prepared as in Example 1, was about 9 $B_c$ and the slurry reached a consistency of about 70 $B_c$ in about 4:01 hr:min. The viscosity of the cement slurry was measured as in Example 1. The mean particle size was about 2.0 microns. The cementitious composition had the following particle size distribution, chemistry and viscosity:

| A. Particle size distribution | |
|---|---|
| % Under 10.48 microns | 100.00% |
| % Under 4.19 microns | 83.43% |
| % Under 1.95 microns | 52.65% |

| B. Chemistry | |
|---|---|
| | % by Weight |
| $C_3S$ | 49.63% |
| $C_2S$ | 9.87% |
| $C_3A$ | 9.31% |
| $C_4AF$ | 4.52% |
| CaO | 57.48% |
| $SiO_2$ | 16.72% |
| $SO_3$ | 9.01% |
| $Al_2O_3$ | 4.35% |
| MgO | 1.58% |
| $Fe_2O_3$ | 1.24% |
| $K_2O$ | 1.31% |
| $TiO_2$ | 0.20% |
| $Na_2O$ | 0.19% |
| Trace Oxides | 0.25% |
| L.O.I. | 7.68% |

| C. Viscosity | |
|---|---|
| RPM | cps |
| 300 | 118 |
| 200 | 102 |
| 100 | 81 |
| 60 | 70 |
| 30 | 55 |
| 6 | 34 |
| 3 | 28 |
| 10 Second Gel | 28 |
| 10 Minute Gel | 33 |

EXAMPLE 6

A cementitious composition was prepared as in Example 4, except that the composition had a specific gravity of about 3.05 and a ratio of $SO_3:Al_2O_3$ of about 1.59. The compressive strength of the composition, measured after 24 hours and after 7 days as in Example 2, was about 350 psi and about 560 psi, respectively. The initial viscosity of the cement slurry, prepared as in Example 1, was about 4 $B_c$ and the slurry reached a consistency of about 70 $B_c$ in about 4:55 hr:min. The viscosity of the cement slurry was measured as in Example 1. The mean particle size was about 2.3 microns. The cementitious composition had the following particle size distribution, chemistry and viscosity:

| A. Particle size distribution | |
|---|---|
| % Under 10.48 microns | 100.00% |
| % Under 4.19 microns | 80.14% |
| % Under 1.95 microns | 47.21% |

| B. Chemistry | |
|---|---|
| | % by Weight |
| $C_3S$ | 46.01% |
| $C_2S$ | 15.50% |
| $C_3A$ | 10.97% |
| $C_4AF$ | 3.88% |
| CaO | 58.20% |
| $SiO_2$ | 17.54% |
| $SO_3$ | 7.87% |
| $Al_2O_3$ | 4.96% |
| MgO | 1.41% |
| $Fe_2O_3$ | 1.28% |
| $K_2O$ | 1.15% |
| $TiO_2$ | 0.19% |
| $Na_2O$ | 0.17% |
| Trace Oxides | 0.25% |
| L.O.I. | 7.01% |

| C. Viscosity | |
|---|---|
| RPM | cps |
| 300 | 95 |
| 200 | 84 |
| 100 | 70 |
| 60 | 60 |
| 30 | 49 |
| 6 | 30 |
| 3 | 23 |
| 10 Second Gel | 23 |
| 10 Minute Gel | 28 |

EXAMPLE 7

A cementitious composition was prepared as in Example 4, except that the composition had a specific gravity of about 3.01 and a ratio or $SO_3:Al_2O_3$ of about 2.16. The compressive strength of the composition, measured after 24 hours and after 7 days as in Example 2, was about 350 psi and about 520 psi, respectively. The initial viscosity of the cement slurry, prepared as in Example 1, was about 5 $B_c$ and the slurry reached a consistency of about 70 $B_c$ in about 3:48 hr:min. The viscosity of the cement slurry was measured as in Example 1. The mean particle size was about 2.0 microns. The cementitious composition had the following particle size distribution, chemistry and viscosity:

| A. Particle size distribution | |
|---|---|
| % Under 9.00 microns | 100.00% |
| % Under 4.19 microns | 83.86% |
| % Under 1.95 microns | 49.65% |

| B. Chemistry | |
|---|---|
| | % by Weight |
| $C_3S$ | 40.51% |
| $C_2S$ | 17.32% |
| $C_3A$ | 10.36% |
| $C_4AF$ | 3.6% |
| CaO | 56.6% |
| $SiO_2$ | 16.79% |
| $SO_3$ | 10.12% |
| $Al_2O_3$ | 4.69% |
| MgO | 1.35% |
| $Fe_2O_3$ | 1.19% |
| $K_2O$ | 1.12% |
| $TiO_2$ | 0.18% |
| $Na_2O$ | 0.16% |
| Trace Oxides | 0.27% |
| L.O.I. | 7.55% |

| C. Viscosity | |
|---|---|
| RPM | cps |
| 300 | 99 |
| 200 | 89 |
| 100 | 72 |
| 60 | 62 |
| 30 | 49 |

| | |
|---|---|
| 6 | 29 |
| 3 | 23 |
| 10 Second Gel | 23 |
| 10 Minute Gel | 32 |

Although the foregoing specific details describe certain embodiments of this invention, persons reasonably skilled in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. An apparatus for making a cementitious composition comprising:
    a first flow line configured to receive a first stream of Type I portland cement;
    a diverter disposed along said first flow line;
    a second flow line downstream from said diverter;
    said diverter configured to remove a scalped portion from said first stream of Type I portland cement and direct the scalped portion along said second flow line;
    said diverter configured to direct a remainder portion of said first stream of Type I portland cement to a downstream portion of said first flow line;
    said second flow line configured to route said scalped portion from said diverter to a classifier;
    said classifier adapted for receiving said scalped portion and separating said scalped portion into a primary portion and a secondary portion;
    a first storage silo connected to said downstream portion of said first flow line;
    a third flow line connected to said classifier and configured to route said secondary portion to said first storage silo;
    said first storage silo adapted for receiving said secondary portion and said remainder portion of said first stream of Type I portland cement;
    a second storage silo adapted for receiving said primary portion; and
    a fourth flow line connected to said classifier and configured to route said primary portion to said second storage silo;
    wherein said primary portion has a particle size distribution such that substantially all of its particles are of a size of about 10 microns or smaller;
    wherein said secondary portion and said remainder portion are combinable to form a resultant cementitious composition;
    wherein said resultant cementitious composition is selected from Type I portland cement and Type III portland cement.

2. The apparatus for making a cementitious composition of claim 1
    wherein said secondary portion and said remainder portion each meet specifications of Type I portland cement.

3. An apparatus for making a cementitious composition comprising:
    a first flow line configured to receive a first stream of portland cement;
    a diverter disposed along said first flow line;
    a second flow line downstream from said diverter;
    said diverter configured to remove a scalped portion from said first stream of portland cement and direct the scalped portion along said second flow line;
    said diverter configured to direct a remainder portion of said first stream of portland cement to a downstream portion of said first flow line;
    said second flow line configured to route said scalped portion from said diverter to a classifier;
    said classifier adapted for receiving said scalped portion and separating said scalped portion into a primary portion and a secondary portion;
    a first storage silo connected to said downstream portion of said first flow line;
    a third flow line connected to said classifier and configured to route said secondary portion of said first storage silo;
    the first storage silo adapted for receiving said secondary portion and said remainder portion of said first stream of portland cement;
    a second storage silo adapted for receiving said primary portion; and
    a fourth flow line connected to said classifier and configured to route said primary portion to said second storage silo;
    wherein said primary portion has a particle size distribution such that substantially all of its particles are of a size of about 10 microns or smaller;
    wherein said secondary portion and said remainder portion are combinable to form a resultant cementitious composition;
    wherein said resultant cementitious composition is selected from Type I portland cement and Type III portland cement.

4. The apparatus for making a cementitious composition of claim 3
    wherein said scalped portion comprises greater than about 10% by volume and less than about 30% by volume of the first stream of portland cement; and
    wherein said secondary portion and said remainder portion exhibit physical characteristics indicative of the same type of standardized portland cement.

5. An apparatus for making a cementitious composition comprising:
    a first classifier adapted for receiving a first resultant cementitious composition from a grinding mill and separating said first resultant cementitious composition into a first stream of Type I portland cement and a recycled portion suitable for being fed back into the grinding mill;
    a cooler disposed along a first flow line and positioned to receive said first stream of Type I portland cement;
    a diverter partition positioned along said first flow line adjacent an outlet of the cooler;
    the diverter partition configured to receive the first stream of Type I portland cement and to divert a first portion of said first stream of Type I portland cement;
    a second classifier adapted for receiving said first portion of said first stream of Type I portland cement and separating said first portion of said first stream of Type I portland cement into a primary portion and a secondary portion;
    a first storage silo positioned along said first flow line downstream of said diverter partition and adapted for receiving said secondary portion and a remainder portion of said first stream of Type I portland cement; and
    a second storage silo adapted for receiving said primary portion;

wherein said primary portion has a particle size distribution such that substantially all of its particles are of a size of about 10 microns or smaller;

wherein said secondary portion and said remainder portion are combinable to form a resultant cementitious composition;

wherein said resultant cementitious composition is selected from Type I portland cement and Type III portland cement.

* * * * *

UNITED STATES PATENT AND TRADEMARK OFFICE
CERTIFICATE OF CORRECTION

PATENT NO. : 8,857,620 B2
APPLICATION NO. : 13/312390
DATED : October 14, 2014
INVENTOR(S) : Louis U. Spellman and Jose Garcia It is certified that error appears in the above-identified patent and that said Letters Patent is hereby corrected as shown below:

In the Specification

In Column 1, Line 25, delete "liner" and insert -- finer -- therefor.

In Column 1, Line 47, delete "hand, it" and insert -- hand, if -- therefor.

In Column 3, Line 40, delete "hulk" and insert -- bulk -- therefor.

In Column 4, Line 33, delete "F." and insert -- F -- therefor.

In Column 4, Line 53, delete "casing:" and insert -- casing; -- therefor.

In Column 5, Line 18, delete "slag:" and insert -- slag; -- therefor.

In Column 5, Line 29, delete "hulk" and insert -- bulk -- therefor.

In Column 5, Line 34, delete "F.," and insert -- F, -- therefor.

In Column 5, Line 37, delete "F.," and insert -- F, -- therefor.

In Column 7, Line 40, delete "F.," and insert -- F, -- therefor.

In Column 7, Line 48, delete "F.," and insert -- F, -- therefor.

In Column 7, Line 53, delete "F.," and insert -- F, -- therefor.

In Column 8, Lines 7-8, for the table labeled "B. Chemistry," in Example 1, insert a horizontal line after the row indicating C4(sub.)AF 4.52%.

Signed and Sealed this
Fifth Day of May, 2015

Michelle K. Lee
*Director of the United States Patent and Trademark Office*

In Column 8, Lines 58-59, for the table labeled "B. Chemistry," in Example 2, insert a horizontal line after the row indicating C4(sub.)AF 5.71%.

In Column 9, Lines 44-45, for the table labeled "B. Chemistry," in Example 3, insert a horizontal line after the row indicating C4(sub.)AF 5.77%.

In Column 10, Lines 30-31, for the table labeled "B. Chemistry," in Example 4, insert a horizontal line after the row indicating C4(sub.)AF 4.62%.

In Column 11, Lines 13-14, for the table labeled "B. Chemistry," in Example 5, insert a horizontal line after the row indicating C4(sub.)AF 4.52%.

In Column 11, Lines 63-64, for the table labeled "B. Chemistry," in Example 6, insert a horizontal line after the row indicating C4(sub.)AF 3.88%.

In Column 12, Lines 49-50, for the table labeled "B. Chemistry," in Example 7, insert a horizontal line after the row indicating C4(sub.)AF 3.6%.